US010191982B1

(12) United States Patent
Reed et al.

(10) Patent No.: US 10,191,982 B1
(45) Date of Patent: Jan. 29, 2019

(54) TOPICAL SEARCH PORTAL

(75) Inventors: Mark William Reed, Fort Thomas, KY (US); Sundaresan Ramachandran Kadayam, Blue Ash, OH (US)

(73) Assignee: Zakata, LLC, Cincinnati, OH (US)

(*) Notice: Subject to any disclaimer, the term of this patent is extended or adjusted under 35 U.S.C. 154(b) by 467 days.

(21) Appl. No.: 12/692,117

(22) Filed: Jan. 22, 2010

Related U.S. Application Data

(60) Provisional application No. 61/146,967, filed on Jan. 23, 2009.

(51) Int. Cl.
*G06F 17/30* (2006.01)

(52) U.S. Cl.
CPC ........ *G06F 17/30864* (2013.01); *G06F 17/30* (2013.01)

(58) Field of Classification Search
CPC ........... G06F 17/3071; G06F 17/30554; G06F 17/30598; G06F 17/30707
USPC .................... 707/708, 726, 731, 737, 740
See application file for complete search history.

(56) References Cited

U.S. PATENT DOCUMENTS

| | | | |
|---|---|---|---|
| 5,317,737 A | 5/1994 | Barton | |
| 5,628,011 A | 5/1997 | Ahamed et al. | |
| 5,712,989 A | 1/1998 | Johnson et al. | |
| 5,768,580 A | 6/1998 | Wical | |
| 5,859,972 A | 1/1999 | Subramaniam et al. | |
| 5,940,821 A | 8/1999 | Wical | |
| 6,028,605 A | 2/2000 | Conrad et al. | |
| 6,038,560 A | 3/2000 | Wical | |
| 6,119,101 A | 9/2000 | Peckover | |
| 6,175,830 B1 | 1/2001 | Maynard | |
| 6,233,586 B1 | 5/2001 | Chang et al. | |
| 6,263,342 B1 | 7/2001 | Chang et al. | |
| 6,272,488 B1 | 8/2001 | Chang et al. | |
| 6,330,714 B1 | 12/2001 | Hicks et al. | |
| 6,370,541 B1 | 4/2002 | Chou et al. | |
| 6,446,083 B1 | 9/2002 | Leight et al. | |
| 6,463,430 B1 | 10/2002 | Brady et al. | |
| 6,466,933 B1 | 10/2002 | Huang et al. | |
| 6,484,166 B1 | 11/2002 | Maynard | |
| 6,513,027 B1 | 1/2003 | Powers et al. | |
| 6,556,976 B1 | 4/2003 | Callen | |
| 6,647,383 B1 | 11/2003 | August et al. | |
| 6,650,998 B1 | 11/2003 | Rutledge et al. | |
| 6,654,813 B1 * | 11/2003 | Black et al. | 709/245 |
| 6,665,681 B1 | 12/2003 | Vogel | |
| 6,735,760 B1 | 5/2004 | Dice | |
| 6,772,153 B1 | 8/2004 | Bacon et al. | |
| 6,778,975 B1 * | 8/2004 | Anick et al. | 707/710 |
| 6,792,601 B1 | 9/2004 | Dimpsey et al. | |
| 6,859,937 B1 | 2/2005 | Narayan et al. | |

(Continued)

OTHER PUBLICATIONS www.clusty.com—Website of combining several top search engines owned by Vivisimo. Viewed Apr. 8, 2010.

(Continued)

*Primary Examiner* — Syling Yen
*Assistant Examiner* — Soheila (Gina) Davanlou
(74) *Attorney, Agent, or Firm* — Frost Brown Todd LLC

(57) ABSTRACT

Methods, systems, devices and/or apparatus related to finding and sharing information on the Internet. Specifically, the disclosed methods, systems, devices and/or apparatus relate to utilizing reference materials to find and share topical information on the Internet.

26 Claims, 7 Drawing Sheets

(56) References Cited

U.S. PATENT DOCUMENTS

| | | |
|---|---|---|
| 6,868,525 B1 | 3/2005 | Szabo |
| 6,920,448 B2 | 7/2005 | Kincaid et al. |
| 6,988,099 B2 | 1/2006 | Wiser et al. |
| 6,994,612 B2 | 2/2006 | Cron |
| 7,031,961 B2 | 4/2006 | Pitkow et al. |
| 7,069,308 B2 | 6/2006 | Abrams |
| 7,073,133 B2 | 7/2006 | Hughes et al. |
| 7,177,818 B2 | 2/2007 | Nair |
| 7,181,438 B1 | 2/2007 | Szabo |
| 7,188,153 B2 | 3/2007 | Lunt et al. |
| 7,222,090 B2 | 5/2007 | Oddo |
| 7,330,846 B1 | 2/2008 | Dirisala et al. |
| 7,343,371 B2 | 3/2008 | Ibuki et al. |
| 7,451,161 B2 | 11/2008 | Zhu et al. |
| 7,461,024 B2 | 12/2008 | Montgomery |
| 7,536,386 B2 | 5/2009 | Samji et al. |
| 7,555,448 B2 | 6/2009 | Hsieh |
| 7,565,425 B2 | 7/2009 | Vleet et al. |
| 7,567,953 B2 | 7/2009 | Kadayam et al. |
| 7,567,963 B2 | 7/2009 | Shpeisman et al. |
| 7,620,572 B2 | 11/2009 | Bowman et al. |
| 7,660,783 B2 | 2/2010 | Reed |
| 7,703,030 B2 | 4/2010 | Smirin et al. |
| 7,707,167 B2 | 4/2010 | Kishore et al. |
| 7,739,218 B2 | 6/2010 | Arguello et al. |
| 7,756,750 B2 | 7/2010 | Venkiteswaran |
| 7,761,385 B2 | 7/2010 | Hutchison et al. |
| 7,860,852 B2 | 12/2010 | Brunner et al. |
| 7,957,985 B2 | 6/2011 | Kashani et al. |
| 7,996,282 B1 | 8/2011 | Scott et al. |
| 8,036,957 B2 | 10/2011 | Ettl et al. |
| 8,046,273 B2 | 10/2011 | Welter et al. |
| 8,051,450 B2 * | 11/2011 | Robarts et al. ............. 725/53 |
| 8,055,673 B2 | 11/2011 | Churchill et al. |
| 8,166,016 B2 | 4/2012 | Higgins et al. |
| 8,204,797 B2 | 6/2012 | Wanker |
| 8,249,885 B2 | 8/2012 | Berkowitz et al. |
| 9,070,164 B2 | 6/2015 | Venkiteswaran |
| 9,607,324 B1 | 3/2017 | Reed et al. |
| 9,996,863 B2 | 6/2018 | Venkiteswaran |
| 10,007,729 B1 | 6/2018 | Reed et al. |
| 2001/0014905 A1 | 8/2001 | Onodera |
| 2001/0034659 A1 | 10/2001 | Kobayashi |
| 2001/0037332 A1 | 11/2001 | Miller et al. |
| 2001/0039592 A1 | 11/2001 | Carden |
| 2002/0026443 A1 | 2/2002 | Chang et al. |
| 2002/0055946 A1 | 5/2002 | Prager et al. |
| 2002/0065744 A1 | 5/2002 | Collins |
| 2002/0077929 A1 | 6/2002 | Knorr et al. |
| 2002/0082952 A1 | 6/2002 | Johnston |
| 2002/0120685 A1 | 8/2002 | Srivastava et al. |
| 2002/0124116 A1 | 9/2002 | Yaung |
| 2002/0147656 A1 | 10/2002 | Tam et al. |
| 2002/0165856 A1 | 11/2002 | Gilfillan et al. |
| 2002/0174122 A1 | 11/2002 | Chou et al. |
| 2002/0188621 A1 | 12/2002 | Flank et al. |
| 2002/0194197 A1 | 12/2002 | Flank |
| 2002/0194198 A1 | 12/2002 | Flank et al. |
| 2002/0194199 A1 | 12/2002 | Flank |
| 2002/0194200 A1 | 12/2002 | Flank et al. |
| 2002/0194208 A1 | 12/2002 | Knoll et al. |
| 2003/0004931 A1 | 1/2003 | Soetarman et al. |
| 2003/0004968 A1 | 1/2003 | Romer et al. |
| 2003/0041054 A1 | 2/2003 | Mao et al. |
| 2003/0084010 A1 | 5/2003 | Bigus et al. |
| 2003/0097360 A1 | 5/2003 | McGuire et al. |
| 2003/0120653 A1 | 6/2003 | Brady et al. |
| 2003/0191757 A1 | 10/2003 | Ambrosini et al. |
| 2003/0217335 A1 | 11/2003 | Chung et al. |
| 2004/0025169 A1 | 2/2004 | Wiser et al. |
| 2004/0100510 A1 | 5/2004 | Milic-Frayling et al. |
| 2004/0167827 A1 | 8/2004 | Vincent et al. |
| 2005/0010561 A1 * | 1/2005 | de Bois et al. ............. 707/3 |
| 2005/0027611 A1 | 2/2005 | Wharton |
| 2005/0144170 A1 | 6/2005 | Wiser et al. |
| 2005/0149538 A1 * | 7/2005 | Singh et al. ............. 707/100 |
| 2005/0160107 A1 * | 7/2005 | Liang ............. 707/100 |
| 2005/0273782 A1 | 12/2005 | Shpeisman et al. |
| 2005/0278321 A1 | 12/2005 | Vailaya et al. |
| 2005/0288920 A1 | 12/2005 | Green et al. |
| 2005/0289168 A1 | 12/2005 | Green et al. |
| 2007/0027811 A1 | 2/2007 | Jackson et al. |
| 2007/0185841 A1 * | 8/2007 | Jones et al. ............. 707/3 |
| 2008/0033959 A1 * | 2/2008 | Jones ............. 707/9 |
| 2008/0040332 A1 * | 2/2008 | Lee et al. ............. 707/3 |
| 2008/0275719 A1 | 11/2008 | Davis et al. |
| 2008/0281793 A1 * | 11/2008 | Mathur ............. 707/3 |
| 2008/0306924 A1 | 12/2008 | Paolini |
| 2009/0144271 A1 * | 6/2009 | Richardson et al. ............. 707/5 |
| 2009/0157490 A1 * | 6/2009 | Lawyer ............. G06Q 10/063 705/59 |
| 2009/0271212 A1 | 10/2009 | Savjani et al. |
| 2009/0327006 A1 | 12/2009 | Hansan et al. |
| 2010/0005061 A1 * | 1/2010 | Basco et al. ............. 707/3 |
| 2010/0169228 A1 | 7/2010 | Rothley et al. |
| 2012/0143721 A1 | 6/2012 | Hutchinson et al. |
| 2012/0143725 A1 | 6/2012 | Hutchinson et al. |
| 2017/0161283 A1 | 6/2017 | Reed et al. |

OTHER PUBLICATIONS www.ask.com—Website of fetching answers to any question asked owned by InterActiveCorp. Viewed Apr. 8, 2010.
www.google.com—Website of hunting for text in webpages owned by Google Inc. Viewed Apr. 8, 2010.
www.yahoo.com—Website of knowledge-sharing for the community. Viewed Apr. 8, 2010.
Basware, Realize Tomorrow's Financial Goals Today, downloaded Jul. 19, 2018 from https://www.basware.com/en-us/about-basware, 2018, 20 pgs.
BirchStreet Systems, Procure-to-Pay on Demand, downloaded Jul. 19, 2018 from https://www.birchstreetsystems.com/about-us/, 2017, 6 pgs.
CapGemini, Annual Report, 2017, downloaded Jul. 19, 2018 from https://reports.capgemini.com/2017/wp-content/uploads/2018/03/CapG_RA17_UK-2.pdf, 41 pgs.
cheeriojs/cheerio, GitHub, Inc., 2018, downloaded from https://github.com/cheeriojs/cheerio.
Coupa Software, Inc., Why Coupa. downloaded Jul. 19, 2018 from https://www.coupa.com/why-coupa/, 2018, 25 pgs.
Determine, Inc., About us, downloaded Jul. 19, 2018 from https://www.determine.com/about-us, 2018, 12 pgs.
GEP, Who we are; About GEP, downloaded Jul. 19, 2018 from https://www.gep.com/company, 2018, 28 pgs.
"Glovia Rolls Out a Powerful, Web-Enabled Configuration Solution," Business Editors and High-tech Writers. Business Wire. New York: May 16, 2001, p. 1, Retrieved via ProQuest on Feb. 27, 2010.
Holst, C., "Infinite Scrolling, Pagination Or "Load More" Buttons? Usability Findings In eCommerce," Smashing Magazine, Mar. 1, 2016, downloaded from https://www.smashingmagazine.com/2016/03/pagination-infinite-scrolling-load-more-buttons/, 23 pgs.
http://findarticles.com/p/articles/mi_hb3381/is_200011/aLn8119-940/, Vinimaya Inc. (business to business online shopping services), Purcahsing, Nov. 16, 2000 (p. 1).
http://findarticles.com/p/articles/mi_hb5932/is_20011 0/ai_n23885081/, Vinimaya Upgrades ViniSyndicate. (Brief Article) (Product Announcement), The Online Reporter, Oct. 15, 2011, (p. 1).
http://findarticles.com/p/articles/mi-mOEIN/is_2000_Nov_6/ai_66626613/, "Vinimaya Expands B2B e-Procurement Platform to 20 Verticals; B2B Marketplaces and Suppliers Can Join the Network to Instantly Reasch Fortune 2000 Purchasing Managers," Business Wire, Nov. 6, 2000 (pp. 1-3).
http://findarticles.com/p/articles/mLmOEIN/is_2000_Oct_11/aL65946458/, "Vinimaya Partners with AnswerPal to Establish B2B Content Development Arm," Business Wire, Oct. 11, 2000, (pp. 1-2).
http://kapowtech.com/index.php/about-us, "About Kapow Technologies," Kapow Technologies website, 2009.

(56) References Cited

OTHER PUBLICATIONS http://www.inc.com/inc5000/2008/company-profile.html?id-200836760, "Company Profile," Inc. 5000, 2009.
Ivalua, Inc., About Ivalua: The Procurement Empowerment Platform, downloaded Jul. 19, 2018 from https://www.ivalua.com/company/about-us/, 2018, 10 pgs.
Letter from PurchasingNet, Inc., May 24, 2006 (4 pages).
Perfect Commerce, About Us, downloaded Jul. 19, 2018 from https://www.linkedin.com/company/perfect-commerce, 2017, 4 pgs.
PhantonJS—Scriptable Headless Browser, Mar. 2018, downloaded from http://phantonjs.org/, 1 pg.
Proactis, ReThink Commerce, downloaded Jul. 19, 2018 from https://www.proactis.com/us/company/about/, 2018, 24 pgs.
Real-Time Computing, description, May 24, 2018, downloaded from https://en.wikipedia.org/wiki/Real-Time_computing, citing Martin, J., *Programming Real-time Computer Systems*, Prentice-Hall, Inc., Englewood Cliffs, NJ, 1965, p. 4, https://en.wikipedia.org/wiki/Real-time_computing#cite_note-3, 3 pgs.
SAP SE, Procurement and Networks, downloaded Jul. 19, 2018 from https://www.sap.com/products/e-procurement.html, 2018, 12 pgs.
SeleniumHQ—Browser Automation, Apr. 4, 2018, downloaded from https://www.seleniumhq.org/, 3 pgs.
Version 4.0 of ViniSyndicate Catalog Integration System™ for E-Procurement. Dec. 6, 2010, 2 pgs. Downloaded from ProQuest Direct on the Internet on Oct. 17, 2014.
Vinimaya website screenshots, Vinimaya website, purported 2000, p. 1-3.
Wax Digital Limited, A Little Bit About Wax Digital, downloaded Jul. 19, 2018 from https://www.waxdigital.com/who-we-are/, 2018, 21 pgs.
www.facebook.com—Website of social networking owned by Facebook, Inc. Viewed on Apr. 8, 2010.
www.linkedin.com—Website of business-oriented social networking, Viewed on Apr. 8, 2010.
www.myspace.com—Website of social networking owned by News Corporation Viewed Apr. 8, 2010.
U.S. Appl. No. 15/889,815, filed Feb. 6, 2018, by Venkiteswaran.
U.S. Appl. No. 16/007,373, filed Jun. 13, 2018, by Kitson et al.
U.S. Appl. No. 16/016,931, filed Jun. 25, 2018, by Reed et al.
U.S. Appl. No. 16/053,157, filed Aug. 2, 2018, by Hutchinson et al.
U.S. Appl. No. 60/336,057, filed Nov. 30, 2001.
U.S. Appl. No. 61/146,967, filed Jan. 23, 2009, by Reed et al.
U.S. Appl. No. 61/146,999, filed Jan. 23, 2009, by Reed et al.
U.S. Appl. No. 61/372,688, filed Aug. 11, 2010, by Reed et al.
U.S. Appl. No. 61/418,936, filed Dec. 2, 2010, by Hutchinson et al.
U.S. Appl. No. 61/418,947, filed Dec. 2, 2010, by Hutchinson et al.
U.S. Appl. No. 62/520,756, filed Jun. 16, 2017, by Reed et al.

* cited by examiner

FIG. 7

TOPICAL SEARCH PORTAL

CROSS REFERENCE TO RELATED APPLICATIONS

This application claims the benefit of U.S. Provisional Patent Application Ser. No. 61/146,967, entitled "Utilizing structured information to support finding and sharing information on the Internet", filed on Jan. 23, 2009, the disclosure of which is incorporated herein by reference. The subject matter of this application is also related to the subject matter disclosed in U.S. patent application Ser. No. 12/692,179, entitled "Topical trust network", filed Jan. 22, 2010 and issued as U.S. Pat. No. 9,607,324 on Mar. 28, 2017, the disclosure of which is incorporated herein by reference.

BACKGROUND

The Internet has become a primary repository of information, but the sheer volume of information makes it difficult to find, organize and share the information available. Typical search engines allow raw unstructured data to be found, but fail to provide tools to organize and share such information. Structured information about topics is available in reference materials such as online encyclopedias, but this structured information is not readily usable in the context of searching and sharing information on the Internet.

Therefore, Internet users may desire a solution to enhance efficiencies of organizing, sharing and/or searching for information on the Internet.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings:

FIG. 7 is a diagram depicting an interface of an example embodiment of the present invention.

DETAILED DESCRIPTION

Figure 1:
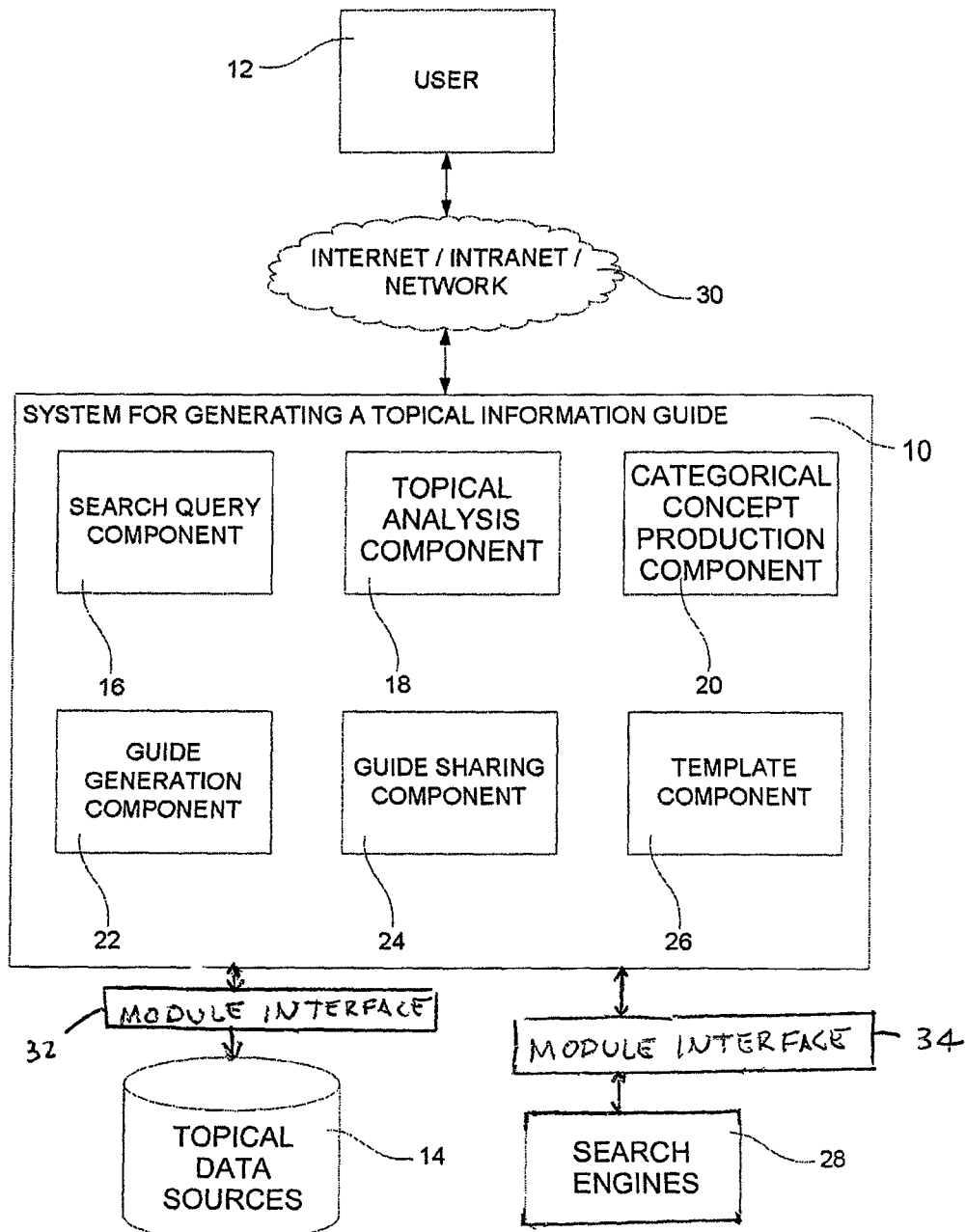
FIG. 1 is a diagram depicting an example embodiment of the present invention.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

This disclosure is drawn to methods, systems, devices and/or apparatus related to finding and sharing information on a large-scale or global computer network such as the Internet. Specifically, the disclosed methods, systems, devices and/or apparatus relate to utilizing reference materials to find and share topical information on the Internet.

Aspects of the disclosed embodiments provide improved methods and systems to utilize reference materials to support the processing of finding and sharing topical information on a large-scale computer network, such as the Internet. Such aspects include, but are not limited to:

(1) identification of a topical search area matching (or otherwise corresponding to) an Internet search query. While conventional network search engines may provide contextual query refinement tools that show similar searches, they may not leverage knowledge of the topical area.

(2) Presentation of a topically relevant organized structure of results as an aid to the search process. This structure may be made up of categorical sub-concepts of the topic that assist in the organization of the available material presented to, or accessible by the user.

(3) Creation of a persistent structured view of a topic that can be published and/or shared on the network. Disclosed embodiments allow the topically relevant, organized structuring of results to be persisted (in the form of a "guide") and shared with others on the network. This may provide others with ready access to the organized, topically relevant information about a subject, and is referred to herein as a "topical information guide" or merely a "guide."

In an example embodiment (as depicted in FIG. 1), a system 10 for generating an interactive topical information guide is provided. Such a system 10 may be linked to and/or be in communication with topical data source(s) 14 over the large-scale network. Topical data source(s) 14 may store and/or link to structured information from numerous sources. Network-accessible encyclopedias, government (public) databases and United Nations databases may provide structured topical information. Systems such as WordNet or OpenCyc may provide structured conceptual information. Resources such as the Central Intelligence Agency (CIA) World Factbook may provide structured locational information. Sources like Epinions.com or Amazon.com may provide structured shopping information. The system 10 may include a search query component 16, a topical analysis component 18, a categorical concept production component 20, a guide generation component 22, a guide sharing component 24 and/or a template component 26. Such components may be provided on one or more network servers, on a user's resident computer, on third party computers accessible over the network and/or upon other known hardware and/or systems available to those in the art.

As will be described in greater detail below, and by example, the search query component 16 may be configured to receive and/or process a user's search query, which may be sent (directly, indirectly, in whole and/or in part) to the topical analysis component. The topical analysis component 18 may be configured to relate one or more topical areas to the search query data received based, at least in part, on structured information in the topical data source(s) 14. The categorical concept production component 20 may be configured to relate a plurality of categorical concepts to the topical area(s) identified by the topical analysis component based, at least in part, on the structured information in the topical data source(s) 14. The guide generation component 22 may be configured to automatically generate (or to at least assist in the generation of) the interactive topical information guide. A topical information guide may include relevant search results (including content and/or links, such as hyper-links, to relevant data resources or locations) for the search query for each of the plurality of categorical concepts. The information guide may also include a title, an annotation, a thumbnail image, video images and/or audio for each categorical concept. Relevant search results may be obtained by utilizing available network search engine(s) 28 and/or other known search methods. The guide generation component 22 may be further configured to receive instructions (interactively, from the user, for example) related to which of the plurality of categorical concepts (and data, links and the like corresponding to such categorical concepts) are to be included in the topical information guide. The guide sharing component 24 may be a configured to share the topical information guide and/or a link to the topical information guide with a third party (e.g., through social network resources). The template component 26 may be configured to suggest predetermined concept sets for possible inclusion in the topical information guide. Search portal users 12 may interact with the system 10 through a computerized data network 30 such as the Internet, an Intranet or other similar network.

In an example embodiment, a module interface component 32 is situated between the system 10 and the topical data source(s) 14, and a module interface component 34 is situated between the system 10 and the search engines 28. In the exemplary embodiment, the system is layered over multiple modules attaching to multiple information repositories, which in turn may be contextually chosen based on the topic/type. In an example embodiment, modules such as a reference module (reference materials such as on-line encyclopedias such as Wikipedia), Web sites module (general web search), books module (book search though services such as Amazon), Educational module (search of educational Web sites), Images module (general image search) and videos module (general videos search) may be supported. Along with categorical concepts based upon a derived topic, the system may also determine a relevant module for a topic type. For example, if the search is for an artist, the system may choose an Image module, or order the Image module first. In other words, topical data source selection and/or search engine selection may be determined based upon the topic derived by the topical analysis component 18.

Figure 2:
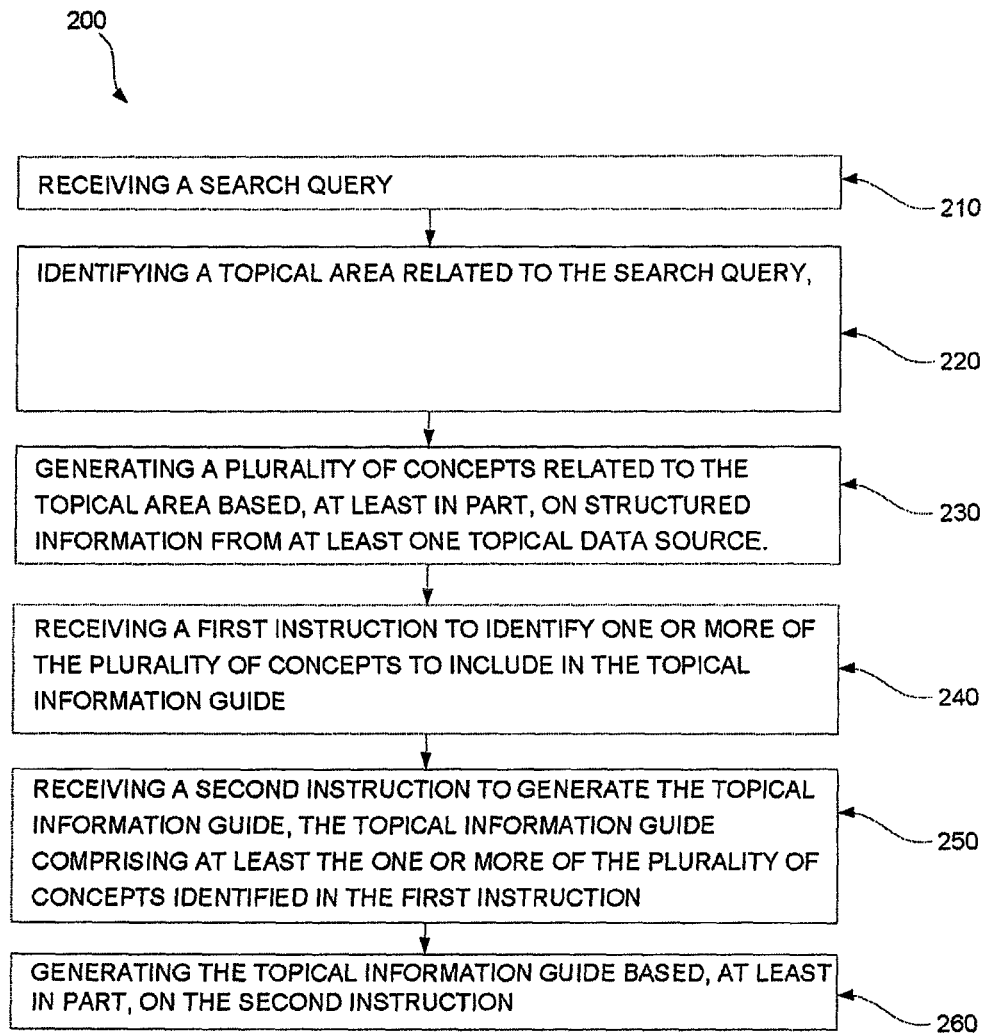
FIG. 2 is a flow diagram depicting an example embodiment of the present invention.

As depicted in FIG. 2, methods for generating a topical information guide is provided. Such methods may include processing operations 210, 220, 230, 240, 250 and/or 260. Example embodiments for implementing such methods are described further below. Beginning at operation 210, a search query may be received (by the search query component 16, for example). Operation 220 may include identifying a topical area related to the search query (by the topical analysis component 18, for example). A topical area may be identified utilizing available language processing algorithms, language mapping algorithms and/or other mechanisms known to those of ordinary skill. Continuing from operation 220, operation 230 may include generating (by the categorical concept production component 20, for example) a plurality of categorical concepts related to the topical area based, at least in part, on structured information stored in and/or linked from topical data source(s) 14. Operation 240 may include receiving one or more instructions, from the user's computer, for example, to identify which categorical concepts of the plurality of categorical concepts are to be included in the topical information guide. Operation 250 may include receiving one or more instructions, from the user's computer, for example, to automatically generate the interactive topical information guide. Steps 240 and 250 may be initiated using a single user interface or separate user interfaces (and the instructions may be received from different users/entities). Operation 260 may include generating the topical information guide based, at least in part, on the instruction of operation 250. The topical information guide generated in operation 260 may include categorical concepts identified in operation 240, and may include other categorical concepts and other data (such as informational data, hyperlink data, images, and the like) associated with such categorical concepts. In some examples, the method may be implemented utilizing a web server, a computer-readable medium having instructions thereon and/or a memory device having software operating thereon.

In some examples, a user may enter a search query. This search query may be analyzed by using available language processing software and mapped to a topical area. Such mapping may be done in one of several ways. One method may be a direct lookup of one or more words and/or phrases in the search query against a database of topics. However, other known methods may also be used to deal with variance in language. For example, a full text index with fielded data using the Lucene software library and a scoring algorithm may be utilized in an example embodiment.

In an example embodiment, an index of encyclopedic information may be used to derive a relevance. The relevance score may be generated based on a number of factors including traditional tf-idf scoring and then factoring on a custom scoring which gives added weight to important structure fields such as the topic name as well as phrase matches. If a highly relevant topic is identified, the highest scoring topic may be chosen as the topical area. Other methods such as a statistical classifier may be used. Once one or more topical area(s) have been identified, one or more topically relevant categorical concepts set may be presented to the user through the user's graphical user interface. Such categorical concept sets may include concepts within the topic that provide a structure of organization to the topic. The categorical concept set may allow for deeper investigation of a topic. Categorical concept sets may be used to build more narrow queries focused on a specific concept (or a subconcept within the broader concept) or may used to organize data.

In some examples, categorical concept sets may be derived from several sources. Encyclopedic data may be mined to provide relevant categorical concepts within the topical area. For example, an encyclopedic article on Ronald Reagan may be divided into information about his acting career (categorical concept #1) as well as information about his political career (categorical concept #2). These categorical concepts may be mined and/or determined from encyclopedic content and presented during a search query on Ronald Reagan, under which some form of search results and other available information may be organized and/or presented.

Another categorical concept set may come from link analysis of encyclopedic data. Encyclopedic data may be mined to determine what other topics are referenced. These other topics may be mined as well and the data may be clustered to determine related concepts within the topical area.

A third set of concepts may come from a database of types. Along with identifying the topical area, there may be a mapping of topics to types. For example, Jimmy Stewart might map to an Actor. With this information, a database can be consulted to provide a concept set associated with that type. For example, the concept set might include a filmography for movie actors. Type information come directly from a database mapping topics to types or may be derived from more complex means such as a trained statistical classifier. Statistical classifications are well known in the machine learning field. An example embodiment uses a fairly standard trained statistical classifier where a known set of data derived from an encyclopedia is processed to produce a sparse array of term weights used as a classifier. Text to be classified is parsed and then has the weights applied to get a confidence score, which is then used to identify the best type—the one with the highest confidence score.

A fourth set of concepts can be generated by the users themselves. While viewing results, the user may have the ability to classify items. In some examples, a user may classify an item from a predefined list of types. For example, the user may select from a list of common Internet resource types such as "Blog" or "User Review". Furthermore, the user may tag an item with other contextually relevant classifications instead of choosing from a predefined list. For example, an item about Ronald Reagan may be tagged as relating to his first term as President.

Once presented to the user, categorical concept sets may be used for a number of improvements to the search process including query refinement and result organization. For example, if filmography is a categorical concept for Jimmy Stewart, a query for "Jimmy Stewart filmography" may be used to narrow the scope of a search. Furthermore, each categorical concept may have a search query associated with it to allow for better query refinement. For instance, the filmography concept may have an associated query "list of films" such that the concept query might become "Jimmy Stewart 'list of films'" to improve search results.

Some examples may also provide methods for using these categorical concept sets to organize and share information with others. The categorical concept sets may be presented to provide a user with an organizational structure for the topic in order to share it with others. In some embodiments, the user may be presented with a form/menu providing automatically generated, topically relevant categorical concepts and/or sub-concepts from which to select. Once selected, a guide may be automatically created that includes, for example, the top search results for each of the selected concepts and/or subconcepts. This "guide" may be saved (or otherwise stored) in a web (or network) application backed by a guide storage database. This persistent structured "guide" may then be edited by the user to further improve its quality. For example, the "guide" may be modified by the user to add text, image, hyper-links and other content, for example. Such extra content may be added through the form/menu or by other available mechanisms. This "guide" may then be published and shared with others. To publish the "guide' in an example embodiment, it is first made accessible on the public Internet (before publication, only editor(s) can see the "guide"). Then, search engines are notified so the "guide" can be indexed by them. One example embodiment may use a sitemap to do this notification. The "guide" may also be propagated through social networks via links and/or widgets An example embodiment supports two all-purpose widgets: AddThis and ShareThis. These widgets allow for distribution through a lot of social networks and Web sites. Many of the social network services (facebook, twitter, etc) have their own widgets that can be used to propagate items to that specific service. These service specific widgets may also be used. The "guide" may also become an Internet resource itself which may be discoverable via search engines and embeddable on other web sites and blogs on the Internet.

In alternate embodiments, relevant concept sets can be built from other sources and used in other ways. For example, other categorical concept sets can be mined from numerous network-accessible data sources. The Open Directory Project, for example, provides a hierarchical ontology of the World Wide Web which may be mined for categorical concept sets. Similarly, categorical concept sets may be used for other presentation and publication mechanisms. For example, categorical concept sets could be used to produce and publish charts (such a pie charts and the like) and graphs of information showing the breakdowns of the amount of information in each concept and/or subconcept.

Figure 3:
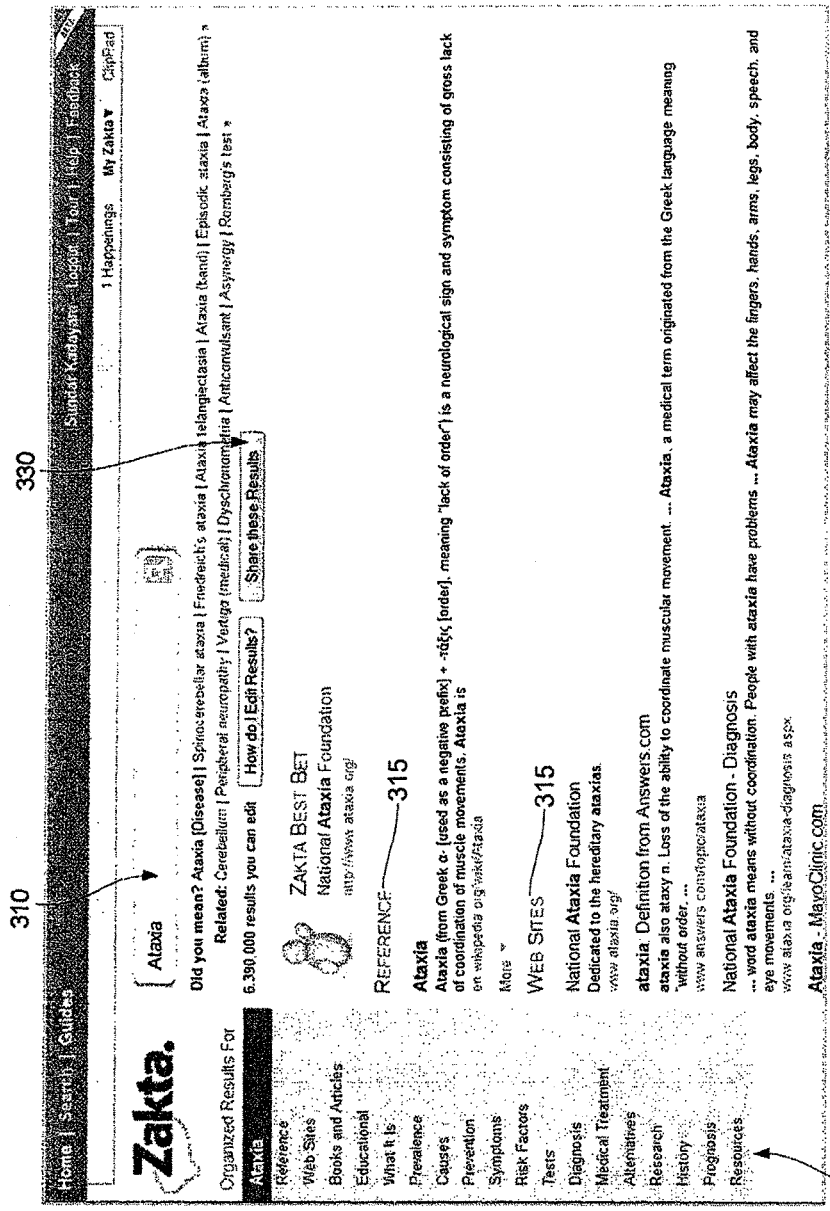
FIG. 3 is a diagram depicting an interface of an example embodiment of the present invention.

In another example embodiment (as depicted in FIGS. 3-7), example graphical and interactive interfaces for the system 10 for generating topical information guides is provided. In FIG. 3, the interface includes a representation of search results for a specific search query. In the example of FIG. 3, the search query "Ataxia" has been entered in the search query field 310. Search results have been organized by categorical concepts 315, such as "Reference," "Web Sites," and the like. The "Zakta Best Bet" link that is generated by taking the link information from structured data compared with link information coming from search engines and finding the best link that is ranked highly by both sources. A categorical concept list 320 may be used to quickly view a specific categorical concept related to the search query. By activating a specific categorical concept in the list 320, the system will be presented with search results and other data corresponding to that categorical concept. In an example embodiment, this could involve taking the user to the section of the page and expanding such information in place. A user may actuate (by "clicking" or otherwise selecting) the "share these results" button 330 to automatically create and share a topical information guide for the search query. Upon actuating the "share these results" button 330, the interface of FIG. 4 may be displayed.

Figure 4:
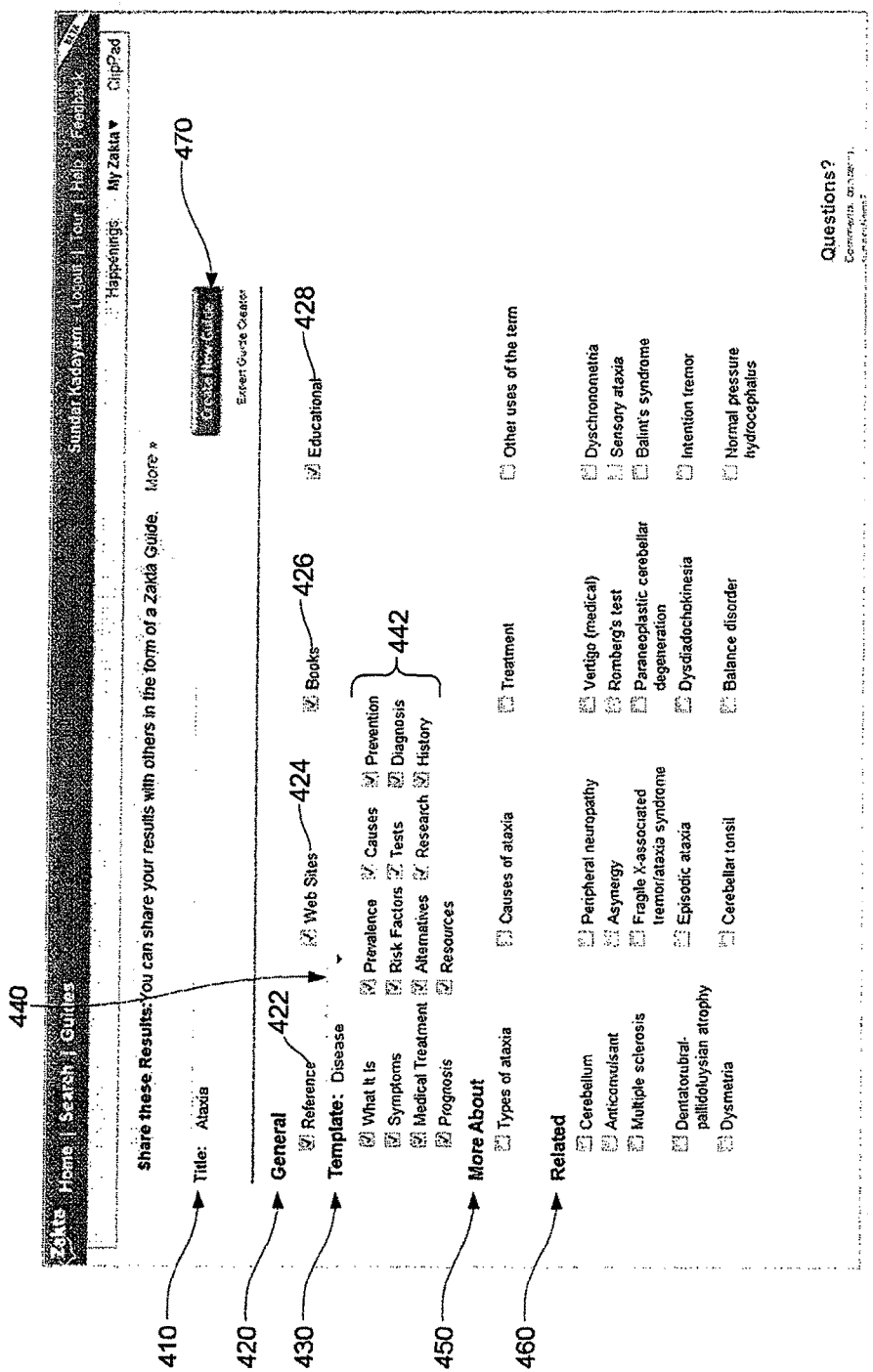
FIG. 4 is a diagram depicting an interface of an example embodiment of the present invention.

In FIG. 4, an interactive graphical interface provides options to generate and customize a topical information guide. The guide title 410 may be customized based on a user's preference. In FIG. 4, the guide title "Ataxia" is displayed. This interface also provides the options to add and/or remove categorical concepts (and/or sub-concepts) from the topical information guide. In this example, concepts 420, 430, 450 and 460 are provided. Subconcepts (such as "Reference" 422, "Web Sites" 424, "Books" 426 and "Educational" 428 under the "General" concept 420) may be selected and de-selected for inclusion and exclusion, respectively, in the topical information guide. The user may also use the Template categorical concept 430 to more efficiently customize the topical information guide. In FIG. 4, the customizable Template concept 430 includes a pull-down menu 440, which provides a plurality of selectable sub-concepts 442 depending upon the categorical concept selected by the user in the pull-down menu 440. As can be seen in this example, the user has selected the categorical concept "Disease" in the pull-down menu 440, and the plurality of selectable sub-concepts ("What it is," "Prevalence," "Causes," and the like) 442 are automatically generated for the selected "Disease" categorical concept. If a user selects another sub-concept from the pull-down menu 440, a different set of selectable sub-concepts 442, where such selectable sub-concepts are more specific concepts related to the more generic concept selected in the pulldown menu, may be provided to the user. When a user has selected the categorical concepts and sub-concepts desired for the guide and then desires to generate the persistent topical information guide, the "Create New Guide" button may be actuated.

Figure 5:
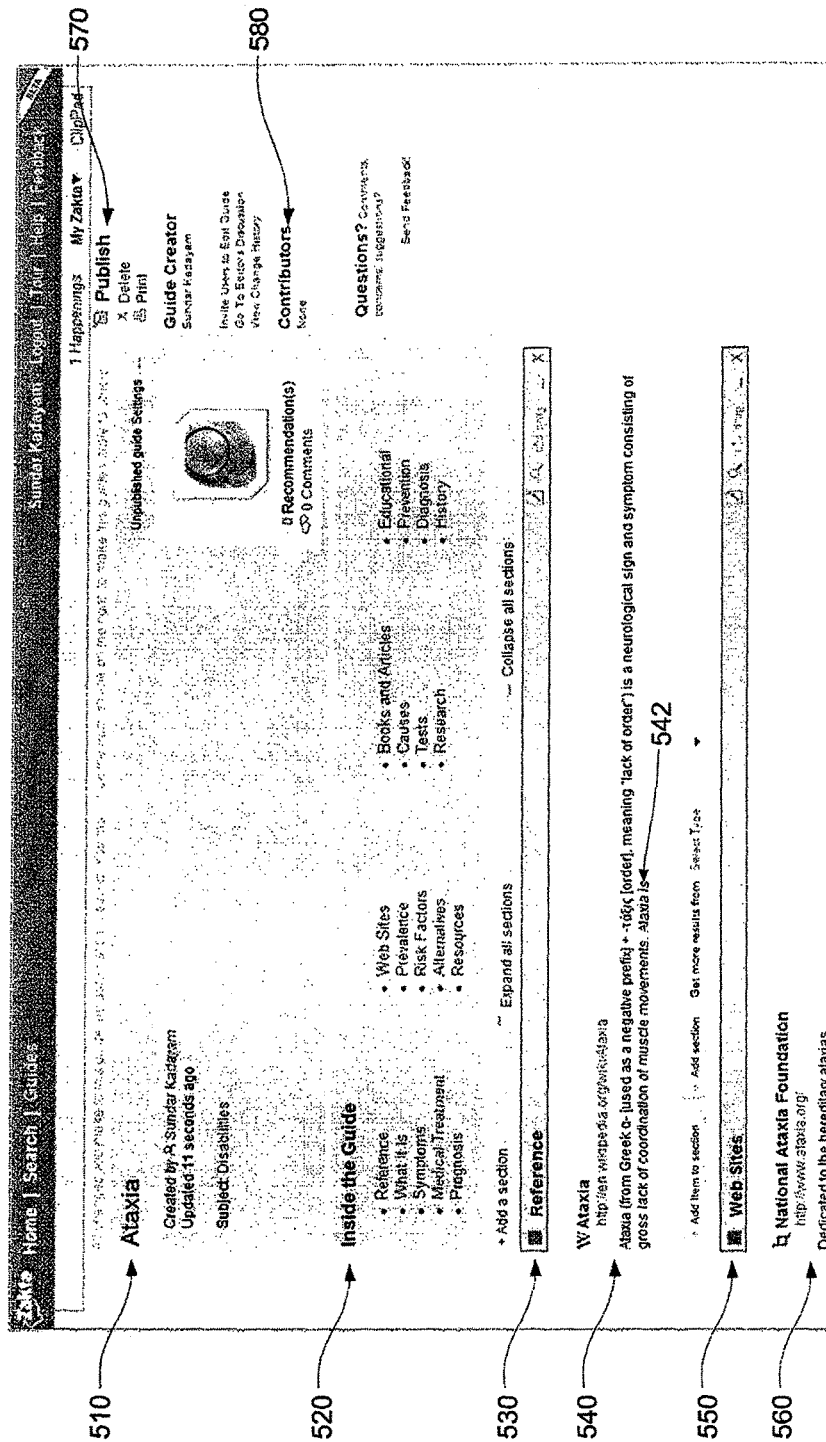
FIG. 5 is a diagram depicting an interface of an example embodiment of the present invention.
Figure 6:
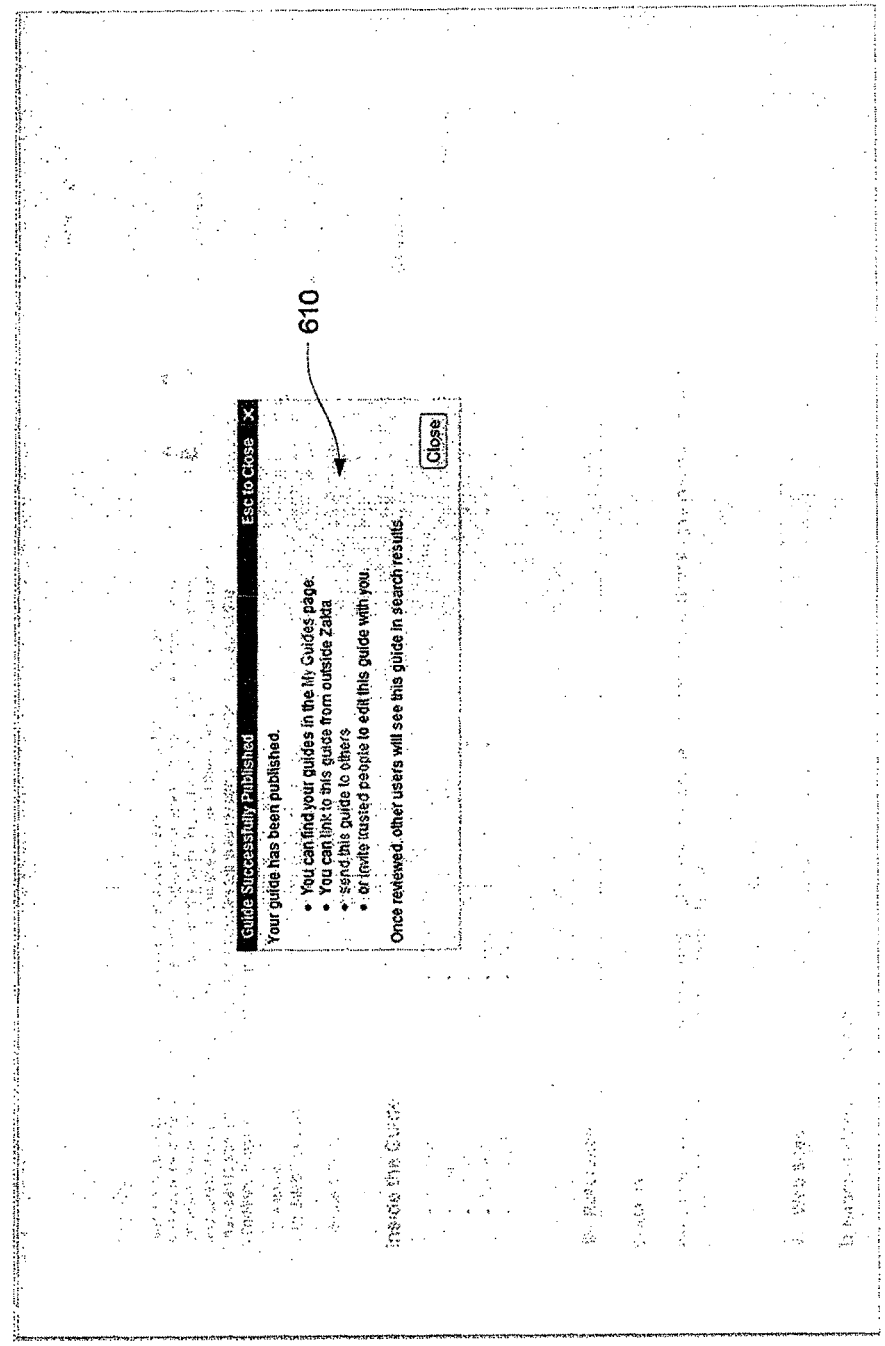
FIG. 6 is a diagram depicting an interface of an example embodiment of the present invention.

In FIG. 5, an interface provides a preview of the topical information guide. The guide title 510, content table 520 and concept headings 530, 550 are displayed. The concept table 520 may include a link to each of the included categorical concepts. Under each categorical concept heading 530, 550, search results 540, 560 related to the search query and organized under a particular concept are displayed. It will be appreciated that other data may also be displayed with each categorical concept, such as encyclopedic data, images, video, audio, and the like. For example, under the "Reference" categorical concept heading 530, a link to a Wikipedia.com entry, for "Ataxia" is displayed for the search query "Ataxia" along with a small passage of text 542 pulled from the linked site. This interface also may allow the guide creator to publish 570, delete and/or print the topical information guide. Additionally, specialty items such as image galleries, polls and the like may be displayed or linked. The topical information guide may also allow multiple contributors to modify the topical information guide. This interface displays the creator and any contributors 580 to the topical information guide. In an example embodiment, each guide has a setting that allows for several types of interaction by others. An editor can invite other editors (which appear on the right hand side of the page in a section and identified as contributors). An editor can allow user contributions that allow users to add items to a special section called "User Contributions." If the editor uses one of these contributions, the contributor appears on the list. A guide can also allow comments that appear at the bottom of the page, and/or recommendations, where users give a thumbs-up/down, or some rating on the guide or on individual items. Upon publishing the topical information guide, a notice 610 may appear (as shown in FIG. 6) advising possible ways to share the topical information.

Figure 7:
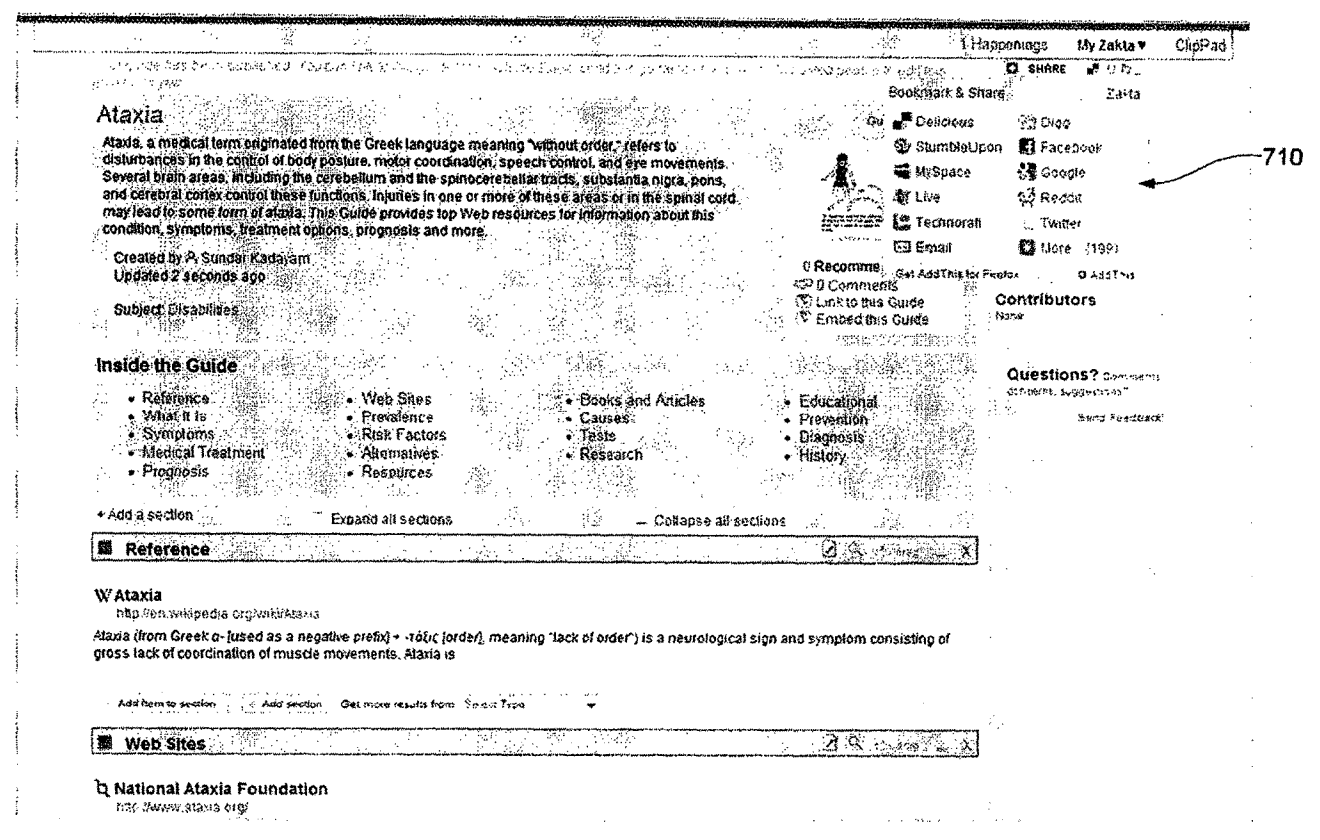

In FIG. 7, an interface showing a published topical information guide is provided. The published topical information guide may provide several ways in which the guide may be shared 710. For example, the topical information guide (or a link thereto) may be shared via social networks, search engines, e-mail, messaging services, content ranking services, social news networks, news aggregator services and other similar services.

To provide additional context for various aspects of the present invention, the following discussion is intended to provide a brief, general description of a suitable computing environment in which the various aspects of the invention may be implemented. While one embodiment of the invention relates to the general context of computer-executable instructions that may run on one or more computers, those skilled in the art will recognize that the invention also may be implemented in combination with other program modules and/or as a combination of hardware and software.

Generally, program modules include routines, programs, components, data structures, etc., that perform particular tasks or implement particular abstract data types. Moreover, those skilled in the art will appreciate that aspects of the inventive methods may be practiced with other computer system configurations, including single-processor or multi-processor computer systems, minicomputers, mainframe computers, as well as personal computers, hand-held wireless computing devices, microprocessor-based or programmable consumer electronics, and the like, each of which can be operatively coupled to one or more associated devices. Aspects of the invention may also be practiced in distributed computing environments where certain tasks are performed by remote processing devices that are linked through a communications network. In a distributed computing environment, program modules may be located in both local and remote memory storage devices.

A computer may include a variety of computer readable media. Computer readable media may be any available media that can be accessed by the computer and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which may be used to store the desired information and which may be accessed by the computer.

An exemplary environment for implementing various aspects of the invention may include a computer that includes a processing unit, a system memory and a system bus. The system bus couples system components including, but not limited to, the system memory to the processing unit. The processing unit may be any of various commercially available processors. Dual microprocessors and other multi processor architectures may also be employed as the processing unit.

The system bus may be any of several types of bus structure that may further interconnect to a memory bus (with or without a memory controller), a peripheral bus, and a local bus using any of a variety of commercially available bus architectures. The system memory may include read only memory (ROM) and/or random access memory (RAM). A basic input/output system (BIOS) is stored in a non-volatile memory such as ROM, EPROM, EEPROM, which BIOS contains the basic routines that help to transfer information between elements within the computer, such as during start-up. The RAM may also include a high-speed RAM such as static RAM for caching data.

The computer may further include an internal hard disk drive (HDD) (e.g., EIDE, SATA), which internal hard disk drive may also be configured for external use in a suitable chassis, a magnetic floppy disk drive (FDD), (e.g., to read from or write to a removable diskette) and an optical disk drive, (e.g., reading a CD-ROM disk or, to read from or write to other high capacity optical media such as the DVD). The hard disk drive, magnetic disk drive and optical disk drive may be connected to the system bus by a hard disk drive interface, a magnetic disk drive interface and an optical drive interface, respectively. The interface for external drive implementations includes at least one or both of Universal Serial Bus (USB) and IEEE 1394 interface technologies.

The drives and their associated computer-readable media may provide nonvolatile storage of data, data structures, computer-executable instructions, and so forth. For the computer, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules may be stored in the drives and RAM, including an operating system, one or more application programs, other program modules and program data. All or portions of the operating system, applications, modules, and/or data may also be cached in the RAM. It is appreciated that the invention may be implemented with various commercially available operating systems or combinations of operating systems.

It is within the scope of the disclosure that a user may enter commands and information into the computer through one or more wired/wireless input devices, for example, a touch screen display, a keyboard and/or a pointing device, such as a mouse. Other input devices may include a microphone (functioning in association with appropriate language processing/recognition software as know to those of ordinary skill in the technology), an IR remote control, a joystick, a game pad, a stylus pen, or the like. These and other input devices are often connected to the processing unit through an input device interface that is coupled to the system bus, but may be connected by other interfaces, such as a parallel port, an IEEE 1394 serial port, a game port, a USB port, an IR interface, etc.

A display monitor or other type of display device may also be connected to the system bus via an interface, such as a video adapter. In addition to the monitor, a computer may include other peripheral output devices, such as speakers, printers, etc.

The computer may operate in a networked environment using logical connections via wired and/or wireless communications to one or more remote computers. The remote computer(s) may be a workstation, a server computer, a router, a personal computer, a portable computer, a personal digital assistant, a cellular device, a microprocessor-based entertainment appliance, a peer device or other common network node, and may include many or all of the elements described relative to the computer. The logical connections depicted include wired/wireless connectivity to a local area network (LAN) and/or larger networks, for example, a wide area network (WAN). Such LAN and WAN networking environments are commonplace in offices, and companies, and facilitate enterprise-wide computer networks, such as intranets, all of which may connect to a global communications network such as the Internet.

The computer may be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi (such as IEEE 802.11x (a, b, g, n, etc.)) and Bluetooth™ wireless technologies. Thus, the communication may be a predefined structure as with a conventional network or simply an ad hoc communication between at least two devices.

The system may also include one or more server(s). The server(s) may also be hardware and/or software (e.g., threads, processes, computing devices). The servers may house threads to perform transformations by employing aspects of the invention, for example. One possible communication between a client and a server may be in the form of a data packet adapted to be transmitted between two or more computer processes. The data packet may include a cookie and/or associated contextual information, for example. The system may include a communication framework (e.g., a global communication network such as the Internet) that may be employed to facilitate communications between the client(s) and the server(s).

Following from the above description and invention summaries, it should be apparent to those of ordinary skill in the art that, while the methods and apparatuses herein described constitute exemplary embodiments of the present invention, it is to be understood that the inventions contained herein are not limited to the above precise embodiment and that changes may be made without departing from the scope of the invention. Likewise, it is to be understood that it is not necessary to meet any or all of the identified advantages or objects of the invention disclosed herein in order to fall within the scope of the invention, since inherent and/or unforeseen advantages of the present invention may exist even though they may not have been explicitly discussed herein.

What is claimed is:

1. One or more computer-readable mediums having instructions thereon, the instructions configured to operate a network accessible computer system to perform the steps of:
   receiving a search query over a computer network;
   identifying a topical area related to the search query;
   generating a plurality of categorical concepts associated with the identified topical area based, at least in part, on structured information from at least one topical data source;
   receiving one or more user instructions, over the computer network, for selecting one or more of the plurality of categorical concepts associated with the identified topical area;
   processing the search query through at least one search engine to produce search result data;
   generating and customizing, from the search result data and from the one or more selected categorical concepts, a network accessible, persistent guide page in the form of a web page containing the search result data organized as a collection of resources for the selected one or more categorical concepts associated with the identified topical area, wherein the persistent guide page is a single page and the collection of resources is viewable without leaving the single page;
   publishing the guide page to the network, upon receipt of a user publication instruction, to allow for (a) subsequent accessing of the guide page by users of the network, (b) subsequent modification of the guide page by users of the network, (c) sharing the guide page with users of the network, and (d) subsequent finding the guide page using a search engine by a user of the network;
   presenting a predefined list of categorical concepts to the user on the persistent guide page;
   receiving an input from the user identifying a categorical concept of the predefined list of categorical concepts and a resources of the collection of resources;

associating the categorical concept with the resource; and reorganizing the persistent guide page to reflect the association between the categorical concept and the resource;

wherein accessing the guide page causes the persistent guide page to be displayed on a device as comprising list of the collection of resources, wherein the list of the collection of resources is ordered based upon each resource in the collection of resources being associated with a single categorical concept of the plurality of categorical concepts, and wherein the list of the collection of resources is associated with at least three categorical concepts of the plurality of categorical concepts.

2. The one or more computer-readable mediums of claim 1, wherein the guide page comprises at least one relevant search result for the search query for each of the plurality of categorical concepts selected in the one or more user instructions.

3. The one or more computer-readable mediums of claim 1, wherein the plurality of categorical concepts related to the identified topical area are generated based, at least in part, on a set of encyclopedic data, wherein the set of encyclopedic data is mined from internet resources based upon the topical area after the topical area is identified.

4. The one or more computer-readable mediums of claim 3, wherein the plurality of categorical concepts related to the identified topical area are generated based, at least in part, on performing a link analysis of the set of encyclopedic data comprising the steps:

identifying a referenced topic within the set of encyclopedic data; and mining a new set of encyclopedic data from internet resources based upon the referenced topic.

5. The one or more computer-readable mediums of claim 4, wherein the plurality of categorical concepts related to the identified topical area are generated based, at least in part, on a type data determined from a topic mapping database, the topic mapping database comprising a set of topics associated with a set of types, and wherein the type data is within the set of types and the topical area is within the set of topics.

6. The one or more computer-readable mediums of claim 1, wherein structured information comprises structured topical information.

7. The one or more computer-readable mediums of claim 1, wherein the structured information comprises structured conceptual information.

8. The one or more computer-readable mediums of claim 1, wherein the structured information comprises structured locational information.

9. The one or more computer-readable mediums of claim 1, wherein the structured information comprises structured shopping information.

10. The one or more computer-readable mediums of claim 1, wherein at least one categorical concept of the plurality of categorical concepts is associated with a categorical sub-concept, wherein the instructions are further configured to operate a network accessible computer system to perform the step of:

presenting the categorical sub-concept to the user on the persistent guide page;

receiving an input from the user to select the categorical sub-concept and reorganizing the persistent guide page to discard any portion of the collection of resources that is associated with the at least one categorical concept but not associated with the categorical sub-concept.

11. The one or more computer-readable mediums of claim 1, wherein the instructions are further configured to operate a network accessible computer system to perform the step of:

receiving an instruction, over the computer network, to revise at least a portion of the guide page and revising the guide page according to the received revising instruction.

12. The one or more computer-readable mediums of claim 1, wherein the instructions are further configured to operate a network accessible computer system to perform the step of:

receiving an instruction, over the computer network, to share at least a portion of the guide page with a third party over the computer network and sharing at least the portion of the guide page on the computer network according to the received sharing instruction.

13. The one or more computer-readable mediums of claim 12, wherein the sharing instruction identifies a social network on which the guide page is to be shared.

14. The one or more computer-readable mediums of claim 1, wherein the instructions are further configured to operate a network accessible computer system to perform the step of:

transmitting, over the computer network, to a third party at least one of the guide page and a link to the guide page.

15. The one or more computer-readable mediums of claim 1, wherein the instructions are further configured to operate a network accessible computer system to perform the step of:

prior to publishing the guide page, generating and displaying a preview of the guide page, the preview of the guide page comprising substantially the same information as the guide page.

16. The one or more computer-readable mediums of claim 1, wherein generating the plurality of categorical concepts further comprises suggesting a predetermined categorical concept set for inclusion in the guide page.

17. The one or more computer-readable mediums of claim 1, wherein the instructions are further configured to select the at least one topical data source based upon the identified topical area.

18. The one or more computer-readable mediums of claim 1, wherein the instructions are further configured to select the at least one search engine based upon the identified topical area.

19. The one or more computer-readable mediums of claim 1, wherein the collection of resources for the selected one or more categorical concepts include one or more of a hyperlink to a relevant data resource, an image, a video, and an audio.

20. The one or more computer-readable mediums of claim 1, wherein the generating step is performed automatically upon receiving instructions to generate the guide page.

21. A computer implemented system for generating a topical information guide, the system being in communication with at least one topic database configured to store structured information, the system comprising:

one or more non-transitory computer mediums including computer instructions in the form of a search query component configured to receive a search query;

one or more non-transitory computer mediums including computer instructions in the form of a topical analysis component in communication with the at least one topical data source, the topical analysis component configured to associate a topical area to the search query;

one or more non-transitory computer mediums including computer instructions in the form of a categorical concept production component in communication the topical analysis component, the concept component configured to associate a plurality of categorical concepts to the topical area provided by the topical analysis component;

one or more non-transitory computer mediums including computer instructions in the form of a guide generation component configured to generate and customize a network accessible, persistent guide page in the form of a web page containing search result data produced from search using the search query organized as a collection of resources for each of a plurality of categorical concepts provided by the categorical concept production component; and one or more non-transitory computer mediums including computer instructions operative to:

publish the guide page to a network to allow for (a) subsequent accessing of the guide page by users of the network, (b) subsequent modifying of the guide page by users of the network, (c) sharing the guide page with users of the network, and (d) subsequent finding the guide page using a search engine by a user of the network;

present a predefined list of categorical concepts to the user on the persistent guide page;

receive an input from the user identifying a categorical concept of the predefined list of categorical concepts and a resources of the collection of resources;

associate the categorical concept with the resource; and reorganize the persistent guide page to reflect the association between the categorical concept and the resource;

wherein accessing the guide page causes the persistent guide page to be displayed on a device as a list of the collection of resources, wherein the list of the collection of resources is ordered based upon each resource in the collection of resources being associated with a single categorical concept of the plurality of categorical concepts, and wherein the list of the collection of resources is associated with at least three categorical concepts of the plurality of categorical concepts.

22. The system of claim 21, wherein the guide generation component is further configured to receive one or more user instructions related to which of the plurality of categorical concepts are to be included in the guide page.

23. The system of claim 21, further comprising:
a computer-implemented guide sharing component configured to share at least one of the guide page and a link to the guide page with a third party over a computer network.

24. The system of claim 21, further comprising:
a computer-implemented template component in communication with the categorical concept production component, the template component configured to suggest a predetermined set of categorical concept for inclusion in the guide page.

25. The system of claim 21, wherein the collection of resources for the selected one or more categorical concepts include one or more of a hyper-link to a relevant data resource, an image, a video, and an audio.

26. The system of claim 21, wherein the guide generation component is configured to generate the guide page automatically upon receiving instructions to generate the guide page.

* * * * *